US011359080B2

(12) United States Patent
Englund et al.

(10) Patent No.: US 11,359,080 B2
(45) Date of Patent: Jun. 14, 2022

(54) POLYMER COMPOSITION AND CABLE WITH ADVANTAGEOUS ELECTRICAL PROPERTIES

(71) Applicant: BOREALIS AG, Vienna (AT)

(72) Inventors: Villgot Englund, Gothenburg (SE); Per-Ola Hagstrand, Stenungsund (SE); Annika Smedberg, Myggenäs (SE); Ulf Nilsson, Stenungsund (SE)

(73) Assignee: BOREALIS AG, Vienna (AT)

( * ) Notice: Subject to any disclaimer, the term of this patent is extended or adjusted under 35 U.S.C. 154(b) by 47 days.

(21) Appl. No.: 17/087,390

(22) Filed: Nov. 2, 2020

(65) Prior Publication Data
US 2021/0122903 A1   Apr. 29, 2021

Related U.S. Application Data

(63) Continuation of application No. 15/522,721, filed as application No. PCT/EP2015/074821 on Oct. 27, 2015, now Pat. No. 10,822,478.

(30) Foreign Application Priority Data

Oct. 27, 2014 (EP) .................................... 14190492

(51) Int. Cl.
| | |
|---|---|
| *C08L 23/06* | (2006.01) |
| *C08K 3/013* | (2018.01) |
| *H01B 3/44* | (2006.01) |
| *C08L 23/08* | (2006.01) |
| *C08K 3/22* | (2006.01) |
| *C08K 3/34* | (2006.01) |
| *C08F 2/02* | (2006.01) |
| *C08K 5/14* | (2006.01) |
| *C08L 71/02* | (2006.01) |
| *C08F 2/38* | (2006.01) |

(52) U.S. Cl.
CPC ............... *C08L 23/06* (2013.01); *C08F 2/02* (2013.01); *C08K 3/013* (2018.01); *C08K 3/22* (2013.01); *C08K 3/34* (2013.01); *C08K 5/14* (2013.01); *C08L 23/0807* (2013.01); *C08L 23/0815* (2013.01); *C08L 71/02* (2013.01); *H01B 3/441* (2013.01); *C08F 2/38* (2013.01); *C08L 2203/202* (2013.01); *C08L 2207/066* (2013.01); *C08L 2312/00* (2013.01)

(58) Field of Classification Search
CPC ......... C08L 2203/202; C08L 2207/066; C08L 23/06; C08L 23/0807; C08L 71/02; C08K 3/0033; C08K 5/14; H01B 3/441
See application file for complete search history.

(56) References Cited

U.S. PATENT DOCUMENTS

| | | | | |
|---|---|---|---|---|
| 4,721,761 A | * | 1/1988 | Omae | C08F 210/00 526/329 |
| 5,246,783 A | * | 9/1993 | Spenadel | H01B 3/441 428/930 |
| 5,539,075 A | * | 7/1996 | Gustafsson | C08F 210/02 526/279 |
| 5,556,697 A | * | 9/1996 | Flenniken | H05K 9/00 174/120 SR |
| 5,852,135 A | * | 12/1998 | Kanai | C08L 53/00 525/399 |
| 6,231,978 B1 | * | 5/2001 | Keogh | C08K 5/14 174/120 SR |
| 9,365,708 B2 | | 6/2016 | Nilsson et al. | |
| 2001/0030053 A1 | * | 10/2001 | Gadessaud | H01B 3/442 174/102 SC |
| 2002/0001715 A1 | * | 1/2002 | Redondo | C08L 23/16 524/436 |
| 2002/0127401 A1 | * | 9/2002 | Perego | C08F 255/02 428/375 |
| 2003/0017328 A1 | * | 1/2003 | Inoue | C09J 7/22 428/424.8 |

(Continued)

FOREIGN PATENT DOCUMENTS

| | | |
|---|---|---|
| WO | 9308222 A1 | 4/1993 |
| WO | 9635732 A1 | 11/1996 |

(Continued)

OTHER PUBLICATIONS

International Search Report and Written Opinion of the International Searching Authority; PCT/EP2015/074821 dated Jan. 5, 2016.
Notification of Concerning Transmittal of International Preliminary Report on Patentability; PCT/EP2015/074821 dated May 2, 2017.
Mark et al., Encyclopedia of Polymer Science and Engineering, Ethylene Polymers, vol. 6 (1986), pp. 382-411.
Kilmesch et al., "Polyethylene: High-pressure", Encyclopedia of Materials: Science and Technology, 2001 Elsevier Science Ltd., pp. 7181-7184.
Randall; "A Review of High Resolution Liquid 13Carbon Nuclear Magnetic Resonance Characterizations of Ethylene-Based Polymers"; Macromolecular Chemistry and Physics; vol. C29; (1989) pp. 201-317.

(Continued)

*Primary Examiner* — Timothy J Thompson
*Assistant Examiner* — Rhadames Alonzo Miller
(74) *Attorney, Agent, or Firm* — Ditthavong, Steiner & Mlotkowski

(57) ABSTRACT

The invention relates to polymer composition comprising a polyolefin (a) and an inorganic filler (b) wherein the polyolefin (a) is obtainable by a high pressure process which process comprises the steps: (i) compressing one or more monomer(s) under pressure in a compressor, using a compressor lubricant for lubrication, (ii) polymerising a monomer optionally together with one or more comonomer(s) in a polymerisation zone, (iii) separating the obtained polyolefin (a) from the unreacted products and recovering the separated polyolefin (a) in a recovery zone, wherein in step (i) the compressor lubricant comprises a non-mineral oil, power cable, for example a direct current (DC) power cable, use of a polymer composition and a process for producing a DC power cable.

13 Claims, No Drawings

(56) References Cited

U.S. PATENT DOCUMENTS

| | | | |
|---|---|---|---|
| 2003/0149176 A1* | 8/2003 | Sekiguchi | C08L 23/0815 525/70 |
| 2004/0210002 A1* | 10/2004 | Haerkoenen | C08F 297/083 525/240 |
| 2006/0151758 A1* | 7/2006 | Reyes | C08K 5/3492 252/601 |
| 2007/0299173 A1* | 12/2007 | Wolfschwenger | C08L 23/12 524/148 |
| 2008/0315159 A1* | 12/2008 | Minagoshi | C08L 23/16 252/500 |
| 2009/0238957 A1* | 9/2009 | Clancy | H01B 7/295 524/451 |
| 2010/0222535 A1* | 9/2010 | Eaton | F04B 39/0215 526/348 |
| 2010/0233146 A1* | 9/2010 | McDaniel | C09D 5/14 435/174 |
| 2010/0319959 A1* | 12/2010 | Eaton | C08L 71/02 174/110 SR |
| 2011/0009571 A1* | 1/2011 | Taft | A61K 9/0019 525/450 |
| 2011/0240064 A1* | 10/2011 | Wales | C09D 7/65 428/116 |
| 2012/0097194 A1* | 4/2012 | McDaniel | C09D 5/14 435/197 |
| 2012/0273253 A1* | 11/2012 | Nilsson | C08F 6/001 174/120 SC |
| 2013/0199817 A1* | 8/2013 | Nilsson | C08K 3/22 524/447 |
| 2015/0291823 A1* | 10/2015 | Fu | H01B 9/006 428/375 |

FOREIGN PATENT DOCUMENTS

| | | |
|---|---|---|
| WO | 2006081400 A2 | 8/2006 |
| WO | 2009012041 A1 | 1/2009 |
| WO | 2009012092 | 1/2009 |
| WO | 2011128147 A1 | 10/2011 |
| WO | 2014099543 A1 | 6/2014 |

OTHER PUBLICATIONS

Brandolini et al., "NMR Spectra of Polymers and Polymer Additives", Marcel Dekker, Inc., New York 2000, pp. 31-39, 44-55, 60-65, 70-73, 78-111.

Berger et al., "200 and More NMR Experiments, A Practical Course", WILEY-VCH Verlag GmbH & Co. KGaA, Neinheim 2004, pp. 18-23, 48-53, 128-131, 144-149, 160-163, 302-305, 318-321.

Olsson, et al., "Experimental Determination of DC Conductivity for XLPE Insulation", Nordic Insulation Symposium 2009, Gothenburg, Sweden, Jun. 15-17, 2009, pp. 55-58.

\* cited by examiner

POLYMER COMPOSITION AND CABLE WITH ADVANTAGEOUS ELECTRICAL PROPERTIES

CROSS REFERENCE TO RELATED APPLICATIONS

This application is a continuation of and claims the benefit under 35 U.S.C. 120 to U.S. Ser. No. 15/522,721, filed Apr. 27, 2017 and entitled "POLYMER COMPOSITION AND CABLE WITH ADVANTAGEOUS ELECTRICAL PROPERTIES", which claims priority from PCT Application Serial No. PCT/EP2015/074821, entitled "POLYMER COMPOSITION AND CABLE WITH ADVANTAGEOUS ELECTRICAL PROPERTIES," filed on Oct. 27, 2015, which claims priority from EP Patent Application Serial No: 14190492.0, filed on Oct. 27, 2014; all of which are incorporated by reference in their entirety herein.

FIELD OF INVENTION

The invention relates to a polymer composition and a power cable, which polymer composition and power cable, may be especially useful in high voltage (HV) and extra high voltage (EHV) cable applications, for example, high voltage direct current (HV DC) or high voltage alternating current (HV AC) applications and extra high voltage direct current (EHV DC) or extra high voltage alternating current (EHV AC) applications.

BACKGROUND

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step to initiate the radical formation and thereby crosslinking reaction.

Peroxides are very common free radical generating compounds used i.a. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size.

Electrical Conductivity

The DC electrical conductivity is an important material property e.g. for insulating materials for high voltage direct current (HV DC) cables. Firstly, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

WO2006081400 discloses a nanocomposite composition comprising a nanoparticle filler having a particle size up to 100 nm. The composition can be used in an insulation layer of power cable applications for tailoring thermal or electrical properties for preventing well known and undesired water treeing in the cable layer.

There are high demands to increase the voltage of a direct current DC power cable, e.g. of a direct current DC power cable, and thus a continuous need to find alternative polymer compositions with reduced conductivity. Such polymer compositions should suitably also have good mechanical properties required for demanding power cable embodiments.

DESCRIPTION OF THE INVENTION

The present invention relates to a polymer composition comprising
a polyolefin (a) and an inorganic filler (b)
wherein the polyolefin is obtainable by a high pressure process which process comprises the steps:
(i) compressing one or more monomer(s) under pressure in a compressor, using a compressor lubricant for lubrication,
(ii) polymerising a monomer optionally together with one or more comonomer(s) in a polymerisation zone,
(iii) separating the obtained polyolefin from the unreacted products and recovering the separated polyolefin in a recovery zone,
wherein in step (i) the compressor lubricant comprises a non-mineral oil.

Unexpectedly, when a polyolefin (a) which polyolefin is obtainable by a high pressure process wherein said process comprises a non-mineral oil, is blended to an inorganic filler (b) the resulting polymer composition exhibits improved electrical properties compared to the electrical properties of the (a) polyolefin alone. Namely, the polymer composition of the invention has reduced, i.e. low, electrical conductivity.

"Reduced" or "low" electrical conductivity as used herein interchangeably means that the value obtained from the DC conductivity method as described herein under "Determination methods" is low, i.e. reduced. The low electrical conductivity (referred also as DC conductivity) is beneficial for minimising the undesired heat formation, e.g. in an insulation layer of a DC power cable.

Accordingly, the low electrical conductivity makes the polymer composition very desirable for DC power cable applications. The voltage applied to the power cable is direct (DC). A DC power cable is defined to be a DC cable transferring energy operating at any voltage level, typically operating at voltages higher than 1 kV. Moreover, the polymer composition is very advantageous layer material for a DC power cable, which can be e.g. a low voltage (LV), a medium voltage (MV), a high voltage (HV) or an extra high voltage (EHV) DC cable, which terms, as well known, indicate the level of operating voltage. The polymer composition may suitably be used in a layer material for a DC power cable operating at voltages higher than 36 kV, such as a HV DC cable. For HV DC cables the operating voltage is defined herein as the electric voltage between ground and the conductor of the high voltage cable.

The polymer composition may suitably be used in a layer of a HV DC power cable operating at voltages of 40 kV or higher, even at voltages of 50 kV or higher. Further, the polymer composition may, for example, be used in a layer of a HV DC power cable operating at voltages of 60 kV or higher. The invention is also suitable in very demanding cable applications and can be used in a layer of a HV DC power cable operating at voltages higher than 70 kV. The upper limit is not limited. The practical upper limit can be up to 900 kV. The invention is advantageous for use in HV DC power cable applications operating from 75 to 400 kV, for example, 75 to 350 kV. The invention is also found to be advantageous even in demanding extra HV DC power cable applications operating 400 to 850 kV.

HV DC power cable means herein either HV DC power cable, for example with operating at voltages as defined herein, or extra high HV DC power cable, e.g. with operating at voltages as defined herein.

It is understood herein that the inorganic filler (b) and the amount thereof present in the polymer composition of the invention has an effect of reducing the conductivity of the polymer composition. Accordingly the polymer composition is differentiated from, and excludes, semiconductive polymer compositions, wherein the inorganic filler, like carbon black, is used in amounts which increase the conductivity, and thus reduce the resistivity, of the semiconductive composition.

The polymer composition can be thermoplastic, i.e. not crosslinked, or crosslinkable.

In an embodiment of the present invention, a polymer composition, as described herein, is disclosed wherein the non-mineral oil is polyalkylene glycol (PAG).

The PAG may be homopolymer(s) of ethylene oxide, propylene oxide, butylene oxide, or octane oxide, or co-polymer(s) of ethylene oxide, propylene oxide, butylene oxide and/or octane oxide. In further embodiments the PAG may be homopolymer(s) of ethylene oxide, propylene oxide, butylene oxide, or octane oxide, or co-polymer(s) of ethylene oxide and/or propylene oxide.

The polymer composition has, for example, an electrical conductivity of 140 fS/m or less, for example, of 135 fS/m or less, for example, of 130 fS/m or less, for example, of 125 fS/m or less, for example, of 120 fS/m or less, for example, of 115 fS/m or less, for example, of from 0.01 to 110 fS/m or less, for example, of from 0.05 to 105 fS/m or less, when measured according to DC conductivity method using a 1 mm thick plaque sample as described under "Determination Methods".

Accordingly, the invention is also directed to a method for reducing, i.e. for providing a low, electrical conductivity of a polymer composition of a power cable, for example, of a DC power cable, by producing at least one layer, for example, an insulation layer, using the polymer composition of the invention.

Further, the polymer composition comprises the polyolefin (a) in an amount of 70% by weight (wt %) or, for example, of 80 wt % or, for example, from 85 to 99.95 wt %, for example, from 90.0 to 99.9 wt %, for example, from 95.0 to 99.9 wt %, for example, from 96.0 to 99.9 wt %, based on the combined amount of the polyolefin (a) and the inorganic filler (b).

The polyolefin (a) can be any suitable polyolefin, e.g. a polyethylene polymerised in a high pressure polymerisation process and, for example, in the presence of an initiator(s), for example, a low density polyethylene (LDPE) polymer polymerised in a high pressure polymerisation process and in the presence of an initiator(s), for example, an LDPE selected from an optionally unsaturated LDPE homopolymer or an optionally unsaturated LDPE copolymer of ethylene with one or more comonomer(s), for example, an LDPE selected from an optionally unsaturated LDPE homopolymer or an optionally unsaturated LDPE copolymer of ethylene with one or more comonomer(s).

"Polyethylene polymerised in the presence of an olefin polymerisation catalyst" is also often called as "low pressure polyethylene" to distinguish it clearly from LDPE. Both expressions are well known in the polyolefin field. "Low density polyethylene", LDPE, is a polyethylene produced in a high pressure polymerization process. Typically the polymerization of ethylene and optional further comonomer(s) in the high pressure process is carried out in the presence of an initiator(s). The meaning of LDPE polymer is well known and documented in the literature.

The inorganic filler (b) can be any inorganic filler, for example, selected from conventional, e.g. commercially available, inorganic fillers usable for an insulation layer. The inorganic filler (b) is further described herein under "Inorganic filler (b)".

The amount of inorganic filler (b) depends on the nature, e.g. density, of the filler. The principle is that inorganic filler (b) is present in an amount which reduces the electrical conductivity of the polymer composition compared to same composition but without the inorganic filler (b). To find such "DC conductivity reducing" amount is within the skills of a skilled person, and can be determined by using the DC conductivity method as defined under "Determination methods".

Further, the amount of the inorganic filler (b) is of up to 30 wt %, for example, of up to 20 wt %, for example, from 0.05 to 15 wt %, for example, from 0.1 to 10.0 wt %, for example, from 0.1 to 5.0 wt %, for example, from 0.1 to 4.0 wt %, based on the combined amount of the polyolefin (a) and the inorganic filler (b).

The amount of the inorganic filler (b) as described herein means the amount of a pure (=neat) inorganic filler compound as such, such as pure $SiO_2$.

The polyolefin (a) and the inorganic filler (b) and the further properties and exemplified embodiments thereof are further described later herein.

Further, the polymer composition of the invention is, for example, crosslinkable.

"Crosslinkable" means that the polymer composition, which may, for example, be comprised in a cable layer, can be crosslinked using a crosslinking agent(s) before the use in the end application thereof. Crosslinkable polymer composition further comprises a crosslinking agent. It is exemplified that the polyolefin (a) of the polymer composition is crosslinked. Moreover, the crosslinked polymer composition or, respectively, the crosslinked polyolefin (a), is, for example, crosslinked via radical reaction with a free radical generating agent. The crosslinked polymer composition has a typical network, i.a. interpolymer crosslinks (bridges), as well known in the field. As evident for a skilled person, the crosslinked polymer composition can be and is defined herein with features that are present in the polymer composition or polyolefin (a) before or after the crosslinking, as stated or evident from the context. For instance the amount of the crosslinking agent in the polymer composition or a compositional property, such as MFR, density and/or unsaturation degree, of the polyolefin (a) are defined, unless otherwise stated, before crosslinking. "Crosslinked" means that the crosslinking step provides a further technical feature to the crosslinked polymer composition (product by process) which makes a further difference over prior art.

The polymer composition has the beneficial low electrical conductivity also when it is crosslinked.

In embodiments, wherein the polymer composition comprises no crosslinking agent, the electrical conductivity as described under the "Determination method" is measured from a sample of said polymer composition which is non-crosslinked (i.e. does not contain a crosslinking agent and has not been crosslinked with a crosslinking agent). In embodiments, wherein the polymer composition is crosslinkable and comprises a crosslinking agent, then the electrical conductivity is measured from a sample of the crosslinked polymer composition (i.e. a sample of the polymer composition is first crosslinked with the crosslinking agent initially present is the polymer composition and then the electrical conductivity is measured from the obtained crosslinked sample). The conductivity measurement from a non-crosslinked or a crosslinked polymer composition sample is described under "Determination Methods". The amount of the crosslinking agent, if present, can vary, for example, within the ranges given herein.

The expression "no crosslinking agent" means herein that the polymer composition does not comprise any crosslinking agent which had been added to the polymer composition for the purpose of crosslinking the polymer composition.

Surprisingly, the polymer composition, wherein the crosslinked polymer composition comprising polyolefin (a) is blended to the inorganic filler (b), and where polyolefin (a) is obtainable by a high pressure process which process comprise the use of a compressor lubricant comprising a non-mineral oil, has a reduced electrical conductivity compared to the electrical conductivity of a crosslinked polyolefin (a) alone.

The crosslinking contributes, for example, also to the mechanical properties and the heat and deformation resistance of the polymer composition.

Accordingly, the polymer composition, for example, comprises crosslinking agent, for example, a peroxide. The polymer composition, for example, comprises peroxide in an amount of up to 110 mmol —O—O—/kg polymer composition, for example, of up to 90 mmol —O—O—/kg polymer composition, for example, of 0 to 75 mmol —O—O—/kg polymer composition, for example, of less than 50 mmol —O—O—/kg polymer composition, for example, of less than 40 mmol —O—O—/kg polymer composition.

In an exemplified embodiment the polymer composition comprises peroxide in an amount of less than 37 mmol —O—O—/kg polymer composition, for example, of less than 35 mmol O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol O—O—/kg polymer composition, for example, from 10.0 to 30 mmol —O—O—/kg polymer composition.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the, well known, dicumyl peroxide based on the total amount (100 wt %) of the polymer composition.

In one exemplified embodiment the DC conductivity of the polymer composition is of 0.01 to 150 fS/m, for example, of 0.01 to 140 fS/m, for example, of 0.05 to 130 fS/m, for example, of 0.05 to 125 fS/m, for example, of 0.05 to 120 fS/m, for example, of 0.05 to 115 fS/m, when measured according to DC conductivity method using a 1 mm thick plaque sample as described under "Determination Methods". In this embodiment it is exemplified that the polymer composition is crosslinkable and comprises, prior crosslinking, peroxide less than less than 50 mmol —O—O—/kg polymer composition, for example, of less than 40 mmol —O—O—/kg polymer composition, for example, of less than 37 mmol —O—O—/kg polymer composition, for example, of less than 35 mmol —O—O—/kg polymer composition.

If crosslinkable, then the polymer composition may comprise one type of peroxide or two or more different types of peroxide, in which case the amount (in mmol) of –O—O—/kg polymer composition, as described herein, is the sum of the amount of –O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy) hexane, 1,1-di(tert-butylperoxy)cyclohexane, 1,1-di(tert amylperoxy)cyclohexane, or any mixtures thereof, can be mentioned, for example, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof, for example, the peroxide is dicumylperoxide.

Additionally, the polymer composition of the invention may contain, in addition to the polyolefin (a), inorganic filler (b) and the optional peroxide, further component(s) such as polymer component(s) and/or additive(s), for example, additive(s), such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s) and voltage stabilizer(s), as known in the polymer field. The polymer composition comprises, for example, conventionally used additive(s) for W&C applications, such as one or more antioxidant(s) and optionally one or more of scorch retarder(s) or crosslinking booster(s), for example, at least one or more antioxidant(s). The used amounts of additives are conventional and well known to a skilled person. As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The amount of polyolefin (a) in the polymer composition of the invention is typically of at least 35 wt %, for example, of at least 40 wt %, for example, of at least 50 wt %, for example, at least 75 wt %, for example, from 80 to 100 wt % and, for example, from 85 to 100 wt %, of the total weight of the polymer component(s) present in the polymer composition. The exemplified polymer composition consists of polyolefin (a) as the only polymer components. The expression means that the polymer composition does not contain further polymer components, but the polyolefin (a) as the sole polymer component. However, it is to be understood herein that the polymer composition may comprise further component(s) other than the polyolefin (a) component, such as additive(s) which may optionally be added in a mixture with a carrier polymer, i.e. in so called master batch. Also the inorganic filler can be added in form of a master batch. In such cases the carrier medium is not calculated to the amount of the polymer components.

The polymer composition, for example, the polyolefin (a), may optionally be unsaturated (contain carbon-carbon double bonds) before the optional crosslinking, as further described herein under the polyolefin (a).

The invention also provides independently a subgroup of the polymer composition which comprises
a polyolefin (a) which is as defined as described herein,
an inorganic filler (b), and
a peroxide in an amount of less than 37 mmol —O—O—/kg polymer composition, for example, of less than 35 mmol —O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, for example, from 10.0 to 30 mmol —O—O—/kg polymer composition.

This subgroup is, for example, crosslinkable and, when crosslinked, provides highly reduced electrical conductivity. The subgroup of polymer composition is novel and exemplified. Further, in this subgroup of the polymer composition comprises the polyolefin (a), which is optionally and, for example, unsaturated, and the inorganic filler (b) in amounts as described herein.

This independent subgroup of the polymer composition of the invention is also exemplified subgroup of the polymer composition of the invention present in at least one layer, for example, at least in the insulation layer, of the power cable of the invention as described herein.

This independent subgroup of the polymer composition of the invention with a low electrical conductivity is very desirable for power cable applications in general. A power cable is defined to be a cable transferring energy operating at any voltage level, typically operating at voltage higher than 1 kV. The voltage applied to the power cable can be alternating (AC), direct (DC) or transient (impulse). The exemplified power cable is AC or DC power cable, for example, a DC power cable as described herein.

In general, it is exemplified that the polymer composition of the invention and the subgroup thereof as described herein are used for producing an insulation layer.

The following exemplified embodiments, properties and subgroups of the polyolefin (a) and the inorganic filler (b) components suitable for the polymer composition are independently generalisable so that they can be used in any order or combination to further define the exemplified embodiments of the polymer composition and the cable produced using the polymer composition. Moreover, it is evident that the given description of the polyolefin (a) applies, unless otherwise stated, to the polyolefin (a) prior optional crosslinking.

Polyolefin (a)

A suitable polyolefin as the polyolefin (a) can be any polyolefin, such as any conventional polyolefin, which can be used in a cable layer, for example, in an insulating layer, of a cable, for example, of a power cable.

Suitable polyolefins as the polyolefin (a) are e.g. as such well known and can be e.g. commercially available or can be prepared according to or analogously to known polymerization processes described in the chemical literature.

Accordingly, the polyolefin (a) is, for example, a
a polyethylene produced in a high pressure process, for example, a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

Where it is referred to polyolefin herein, e.g. polyethylene, this is intended to mean both a homo- and copolymer, e.g. an ethylene homo- and copolymer. The polyolefin copolymer may contain one or more comonomer(s).

As well known "comonomer" refers to copolymerisable comonomer units.

In case a polyolefin (a) is a copolymer of ethylene with at least one comonomer, then suitable such other comonomer is selected from non-polar comonomer(s) or polar comonomers, or any mixtures thereof. Exemplified other non-polar comonomers and polar comonomers are described herein in relation to polyethylene produced in a high pressure process.

The polyethylene polymer as the polyolefin (a) can be a polyethylene polymerised in a high pressure (HP) polymerisation process, for example, in the presence of an intiator(s).

The polyolefin (a) may be a low density polyethylene (LDPE) polymer produced in a high pressure (HP) polymerisation process. It is to be noted that a polyethylene produced in a high pressure (HP) process is referred herein generally as LDPE and which term has a well known meaning in the polymer field. Although the term LDPE is an abbreviation for low density polyethylene, the term is understood not to limit the density range, but covers the LDPE-like high pressure (HP) polyethylenes with low, medium and higher densities. The term LDPE describes and distinguishes only the nature of HP polyethylene with typical features, such as high branching architecture, compared to the PE produced in the presence of an olefin polymerisation catalyst.

The exemplified polyolefin (a) may be an LDPE polymer which may be a low density homopolymer of ethylene (referred herein as LDPE homopolymer) or a low density copolymer of ethylene with one or more comonomer(s) (referred herein as LDPE copolymer). The one or more comonomers of LDPE copolymer are, for example, selected from the polar comonomer(s), non-polar comonomer(s) or from a mixture of the polar comonomer(s) and non-polar comonomer(s), as described herein. Moreover, said LDPE homopolymer or LDPE copolymer as said polyolefin (a) may optionally be unsaturated.

As a polar comonomer for the LDPE copolymer as said polyolefin (a), comonomer(s) containing hydroxyl group(s), alkoxy group(s), carbonyl group(s), carboxyl group(s), ether group(s) or ester group(s), or a mixture thereof, can be used. Further, for example, comonomer(s) containing carboxyl and/or ester group(s) are used as said polar comonomer. Furthermore, for example, the polar comonomer(s) of LDPE copolymer is selected from the groups of acrylate(s), methacrylate(s) or acetate(s), or any mixtures thereof. If present in said LDPE copolymer, the polar comonomer(s) is, for example, selected from the group of alkyl acrylates, alkyl methacrylates or vinyl acetate, or a mixture thereof. Further, for example, if present, said polar comonomers are selected from $C_1$- to $C_6$-alkyl acrylates, $C_1$- to $C_6$-alkyl methacrylates or vinyl acetate. For example, said polar LDPE copolymer as the polyolefin (a) is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin (a), comonomer(s) other than the herein described polar comonomers can be used, for example, the non-polar comonomers are other than comonomer(s) containing hydroxyl group(s), alkoxy group(s), carbonyl group(s), carboxyl group(s), ether group(s) or ester group(s). One group of exemplified non-polar comonomer(s) comprise, for example, consist of, monounsaturated (=one double bond) comonomer(s), for example, olefins, for example, alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described herein in relation to unsaturated LDPE copolymers.

If the LDPE polymer is a copolymer, it, for example, comprises 0.001 to 50 wt.-%, for example, 0.05 to 40 wt.-%, for example, less than 35 wt.-%, for example, less than 30 wt.-%, for example, less than 25 wt.-%, of one or more comonomer(s).

The polymer composition, for example, at least the polyolefin (a) component thereof, for example, the LDPE polymer, may optionally be unsaturated, i.e. the polymer composition, for example, the polyolefin (a), for example, the LDPE polymer, may comprise carbon-carbon double bonds (—C═C—). The "unsaturated" means herein that the polymer composition, for example, the polyolefin (a), contains carbon-carbon double bonds/1000 carbon atoms in a total amount of at least 0.1; at least 0.2; at least 0.3 or alternatively, at least 0.4/1000 carbon atoms.

As well known, the unsaturation can be provided to the polymer composition i.a. by means of the polyolefin component(s), a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the polymer composition means the sum of the double bonds present in the double-bond sources. It is evident that a characteristic model compound for calibration is used for each chosen source to enable the quantitative infrared (FTIR) determination.

Any double bond measurements are carried out prior to optional crosslinking.

If the polymer composition is unsaturated (prior to optional crosslinking), then it is exemplified that the unsaturation originates at least from an unsaturated polyolefin (a) component. The unsaturated polyolefin (a) is an unsaturated polyethylene, for example, an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In an exemplified embodiment the term "total amount of carbon-carbon double bonds" is defined from the unsaturated polyolefin (a), and refers, if not otherwise specified, to the combined amount of double bonds which originate from vinyl groups, vinylidene groups and trans-vinylene groups, if present. Naturally the polyolefin (a) does not necessarily contain all the three types of double bonds described herein. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerization conditions. if an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is, for example, an unsaturated LDPE copolymer of ethylene with at least one polyunsaturated comonomer, and optionally with other comonomer(s), such as polar comonomer(s) which is, for example, selected from acrylate or acetate comonomer(s). Further, an unsaturated LDPE copolymer is an unsaturated LDPE copolymer of ethylene with at least polyunsaturated comonomer(s).

The polyunsaturated comonomers suitable for the unsaturated polyolefin (a), for example, consist of a straight carbon chain with at least 8 carbon atoms and at least 4 carbons between the non-conjugated double bonds, of which at least one is terminal, for example, said polyunsaturated comonomer is a diene, for example, a diene which comprises at least eight carbon atoms, the first carbon-carbon double bond being terminal and the second carbon-carbon double bond being non-conjugated to the first one. Exemplified dienes are selected from $C_8$ to $C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Further, the diene is selected from 1,7-octadiene, 1,9-decadiene, 1,11-dodecadiene, 1,13-tetradecadiene, or any mixture thereof, however, without limiting to dienes described herein.

It is well known that e.g. propylene can be used as a comonomer or as a chain transfer agent (CTA), or both, whereby it can contribute to the total amount of the carbon-carbon double bonds, for example, to the total amount of the vinyl groups. Herein, when a compound which can also act as comonomer, such as propylene, is used as CTA for providing double bonds, then said copolymerisable comonomer is not calculated to the comonomer content.

If the polyolefin (a), for example, the LDPE polymer, is unsaturated, then it has, for example, a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is, for example, higher than 0.40/1000 carbon atoms, for example, higher than 0.50/1000 carbon atoms, for example, higher than 0.60/1000 carbon atoms.

The polyolefin (a) is an unsaturated LDPE as described herein and contains at least vinyl groups and the total amount of vinyl groups is, for example, higher than 0.05/1000 carbon atoms, for example, higher than 0.08/1000 carbon atoms, and, for example, of higher than 0.11/1000 carbon atoms, for example, the total amount of vinyl groups is of lower than 4.0/1000 carbon atoms. The polyolefin (a), prior to crosslinking, contains vinyl groups in total amount of more than 0.20/1000 carbon atoms, for example, of more than 0.30/1000 carbon atoms.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example an insulation layer, comprises LDPE polymer, e.g., LDPE copolymer, which contains vinyl groups in total amount of more than 0.50/1000 carbon atoms.

In further embodiments of the present invention polyolefin may be a saturated LDPE homopolymer or a saturated LDPE copolymer of ethylene with one or more comonomer(s); or an unsaturated LDPE polymer, which is selected from an unsaturated LDPE homopolymer or an unsaturated LDPE copolymer of ethylene with one or more comonomer(s), for example, an unsaturated LDPE homopolymer or an unsaturated LDPE copolymer of ethylene with one or more comonomer(s), which is, for example, at least one polyunsaturated comonomer, for example, a diene as described herein, and optionally with other comonomer(s), and has the total amount of carbon-carbon double bonds, which originate from vinyl groups, vinylidene groups and trans-vinylene groups, if present, as described herein, for example, has the total amount of vinyl groups as described herein. Said unsaturated LDPE polymer is highly usable for an insulation layer of a power cable, for example, of a DC power cable, of the invention.

In an exemplified embodiment the polyolefin (a) is an unsaturated LDPE polymer as described herein and the polymer composition contains the exemplified "low" peroxide content of the invention as described herein. Higher double bond content combined with the exemplified "low" peroxide content further contributes to the low electrical conductivity. The embodiment is also exemplified e.g. if high cable production speed or longer extrusion time, or both, is desired. The embodiment also contributes to the desirable mechanical and/or heat resistance properties are needed for the layer, for example, insulation layer, material.

The exemplified polyolefin (a) for use in the polymer composition is an unsaturated LDPE copolymer of ethylene with at least one polyunsaturated comonomer, for example, a diene as described herein, and optionally with other comonomer(s), and has the total amount of carbon-carbon double bonds, which originate from vinyl groups, vinylidene groups and trans-vinylene groups, if present, as described herein, for example, has the total amount of vinyl groups as described herein. Said unsaturated LDPE copolymer is highly usable for the invention for use as the polyolefin (a) of a polymer composition, exemplified in an insulation layer of a power cable, for example, of a DC power cable.

Typically, and, for example, in wire and cable (W&C) applications, the density of the polyolefin (a), for example, of the LDPE polymer, is higher than 860 kg/m$^3$, for example, the density of the polyolefin (a), for example, of the LDPE homopolymer or copolymer, is not higher than 960 kg/m$^3$, and, for example, is from 900 to 945 kg/m$^3$. The MFR$_2$ (2.16 kg, 190° C.) of the polyolefin (a), for example, of the LDPE polymer, is, for example, from 0.01 to 50 g/10 min, for example, from 0.01 to 40.0 g/10, for example, is from 0.1 to 20 g/10 min, and, for example, is from 0.2 to 10 g/10 min.

Accordingly, the polyolefin (a) of the invention is a LDPE polymer, which is, for example, produced at high pressure process by free radical initiated polymerisation (referred to as high pressure (HP) radical polymerization). The HP reactor can be e.g. a well known tubular or autoclave reactor or a mixture thereof, for example, a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, from 80 to 350° C. and pressure from 70 MPa, for example, 100 to 400 MPa, for example, from 100 to 350 MPa. Pressure can be measured at least after compression stage and/or after the tubular reactor. Temperature can be measured at several points during all steps.

Compressor Lubricant

The compressor lubricant used in the polymerization process for producing the exemplified polyolefin of the polymer composition comprises a non-mineral oil.

In an embodiment of the present invention, a polymer composition, as described herein, is disclosed wherein the non-mineral oil is polyalkylene glycol (PAG).

The PAG may be homopolymer(s) of ethylene oxide, propylene oxide, butylene oxide, or octane oxide, or co-polymer(s) of ethylene oxide, propylene oxide, butylene oxide and/or octane oxide. In further embodiments the PAG may be homopolymer(s) of ethylene oxide, propylene oxide, butylene oxide, or octane oxide, or co-polymer(s) of ethylene oxide and/or propylene oxide.

The non-mineral oil may, for example, be comprised in the polyolefin (a) in an amount of 10 to 250 ppm or, alternatively, 20 to 200 ppm.

The compressor lubricant may comprise other components, such as lubricity additive(s), viscosity builders, antioxidants, other additive(s) or any mixtures thereof, as well known in the art.

Process

The high pressure (HP) process is the exemplified process for producing a polyolefin of the polymer composition, for example, a low density polyethylene (LDPE) polymer selected from LDPE homopolymer or LDPE copolymer of ethylene with one or more comonomers.

The invention further provides a process for polymerising a polyolefin in a high pressure process which comprises the steps of:

(a) compressing one or more monomer(s) under pressure in a compressor, wherein a compressor lubricant is used for lubrication, (b) polymerising a monomer optionally together with one or more comonomer(s) in a polymerisation zone(s), (c) separating the obtained polyolefin from the unreacted products and recovering the separated polyolefin in a recovery zone, wherein in step a) a compressor lubricant comprises a non-mineral oil including the exemplified embodiments thereof.

Accordingly, the polyolefin of the invention is, for example, produced at high pressure by free radical initiated polymerisation (referred to as high pressure radical polymerization). The exemplified polyolefin is LDPE homopolymer or LDPE copolymer of ethylene with one or more comonomer(s), as described herein. The LDPE polymer obtainable by the process of the invention, for example, provides the advantageous electrical properties as described herein. The high pressure (HP) polymerisation and the adjustment of process conditions for further tailoring the other properties of the polyolefin depending on the desired end application are well known and described in the literature, and can readily be used by a skilled person.

Compression Step a) of the Process of the Invention:

Monomer, for example, ethylene, with one or more optional comonomer(s), is fed to one or more compressor at compressor zone to compress the monomer(s) up to the desired polymerization pressure and to enable handling of high amounts of monomer(s) at controlled temperature. Typical compressors, i.e. hyper-compressors, for the process can be piston compressors or diaphragm compressors. The compressor zone usually comprises one or more compressor(s), i.e. hyper-compressor(s), which can work in series or in parallel. The compressor lubricant of the invention is used for cylinder lubrication in at least one, for example, in all of the hyper-compressor(s), present in the compressor zone. The compression step a) comprises usually 2-7 compression steps, often with intermediate cooling zones. Temperature is typically low, usually in the range of less than 200° C., for example, of less than 100° C. Any recycled monomer, for example, ethylene, and optional comonomer(s) can be added at feasible points depending on the pressure.

Polymerisation Step b) of the Process:

Exemplified high pressure polymerisation is effected at a polymerisation zone which comprises one or more polymerisation reactor(s), for example, at least a tubular reactor or an autoclave reactor, for example, a tubular reactor. The polymerization reactor(s), for example, a tubular reactor, may comprise one or more reactor zones, wherein different polymerization conditions may occur and/or adjusted as well known in the HP field. One or more reactor zone(s) are provided in a known manner with means for feeding monomer and optional comonomer(s), as well as with means for adding initiator(s) and/or further components, such as CTA(s). Additionally, the polymerization zone may comprise a preheating section which is preceding or integrated to the polymerization reactor. In one exemplified HP process the monomer, for example, ethylene, optionally together with one or more comonomer(s) is polymerized in an exemplified tubular reactor, for example, in the presence of chain transfer agent(s).

Tubular Reactor:

The reaction mixture is fed to the tubular reactor. The tubular reactor may be operated as a single-feed system (also known as front feed), wherein the total monomer flow from the compressor zone is fed to the inlet of the first reaction zone of the reactor. Alternatively the tubular reactor may be a multifeed system, wherein e.g. the monomer(s), the optional comonomer(s) or further component(s) (like CTA(s)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer(/comonomer) and/or optional further component(s), such as CTA, and, respectively, the split streams of initiator(s) may have the same or different component(s) or concentrations of the components, or both.

The single feed system for the monomer and optional comonomer(s) is exemplified in the tubular reactor for producing the polyolefin of the invention.

First part of the tubular reactor is to adjust the temperature of the feed of monomer, for example, ethylene, and the optional comonomer(s); usual temperature is below 200° C., such as 100-200° C. Then the radical initiator is added. As the radical initiator, any compound or a mixture thereof that decomposes to radicals at an elevated temperature can be used. Usable radical initiators, such as peroxides, are commercially available. The polymerization reaction is exothermic. There can be several radical initiator injections points, e.g. 1-5 points, along the reactor usually provided with separate injection pumps. As already mentioned also the monomer, for example, ethylene, and optional comonomer(s), is added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are, for example, used in the polymerization process of the Polyolefin. Exemplified CTA(s) can be selected from one or more non-polar and one or more polar CTA(s), or any mixtures thereof.

Non-polar CTA, if present, is, for example, selected from i) one or more compound(s) which does not contain a polar group selected from nitrile (CN), sulfide, hydroxyl, alkoxy, aldehyl (HC=O), carbonyl, carboxyl, ether or ester group(s), or mixtures thereof. Non-polar CTA is, for example, selected from one or more non-aromatic, straight chain branched or cyclic hydrocarbyl(s), optionally containing a hetero atom such as O, N, S, Si or P. The non-polar CTA(s) is, for example, selected from one or more cyclic alpha-olefin(s) of 5 to 12 carbon or one or more straight or branched chain alpha-olefin(s) of 3 to 12 carbon atoms, for example, from one or more straight or branched chain alpha-olefin(s) of 3 to 6 carbon atoms. The exemplified non-polar CTA is propylene.

The polar CTA, if present, is, for example, selected from
i) one or more compound(s) comprising one or more polar group(s) selected from nitrile (CN), sulfide, hydroxyl, alkoxy, aldehyl (HC=O), carbonyl, carboxyl, ether or ester group(s), or mixtures thereof;
ii) one or more aromatic organic compound(s), or
iii) any mixture thereof.

Further, any such polar CTA(s) have, for example, up to 12 carbon atoms, e.g. up to 10 carbon atoms, for example, up to 8 carbon atoms. An exemplified option includes a straight chain or branched chain alkane(s) having up to 12 carbon atoms (e.g. up to 8 carbon atoms) and having at least one nitrile (CN), sulfide, hydroxyl, alkoxy, aldehyl (HC=O), carbonyl, carboxyl or ester group.

Moreover, the polar CTA(s), if present, is, for example, selected from i) one or more compound(s) containing one or more hydroxyl, alkoxy, HC=O, carbonyl, carboxyl and ester group(s), or a mixture thereof, for example, from one or more alcohol, aldehyde and/or ketone compound(s). The exemplified polar CTA(s), if present, is a straight chain or branched chain alcohol(s), aldehyde(s) or ketone(s) having up to 12 carbon atoms, for example, up to 8 carbon atoms, especially up to 6 carbon atoms, for example, isopropanol (IPA), methylethylketone (MEK) and/or propionaldehyde (PA).

The amount of the exemplified CTA(s) is not limited and can be tailored by a skilled person within the limits of the invention depending on the desired end properties of the final polymer. Accordingly, the exemplified chain transfer agent(s) can be added in any injection point of the reactor to the polymer mixture. The addition of one or more CTA(s) can be effected from one or more injection point(s) at any time during the polymerization.

In case the polymerization of the polyolefin is carried out in the presence of a CTA mixture comprising one or more polar CTA(s) as described herein and one or more non-polar CTA(s) as described herein, then the feed ratio by weight % of polar CTA to non-polar CTA is, for example, 1 to 99 wt % of polar CTA and
1 to 99 wt % of non-polar CTA, based on the combined amount of the feed of polar CTA and the non-polar CTA into the reactor.

The addition of monomer, comonomer(s) and optional CTA(s) may include and typically includes fresh and recycled feed(s).

The reactor is continuously cooled e.g. by water or steam. The highest temperature is called peak temperature and the reaction starting temperature is called initiation temperature. Suitable temperatures range up to 400° C., for example, from 80 to 350° C. and pressure from 700 bar, for example, 1000 to 4000 bar, for example, from 1000 to 3500 bar. Pressure can be measured at least after compression stage and/or after the tubular reactor.

Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve a so-called production control valve. The valve regulates reactor pressure and depressurizes the reaction mixture from reaction pressure to separation pressure.

Recovering Step c) of the Process:
Separation:

The pressure is typically reduced to approx. 100 to 450 bar and the reaction mixture is fed to a separator vessel where most of the unreacted, often gaseous, products are removed from the polymer stream. Unreacted products comprise e.g. monomer or the optional comonomer(s), and most of the unreacted components are recovered. The polymer stream is optionally further separated at lower pressure, typically less than 1 bar, in a second separator vessel where more of the unreacted products are recovered. Normally low molecular compounds, i.e. wax, are removed from the gas. The gas is usually cooled and cleaned before recycling.

Recovery of the Separated Polymer:

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

As to polymer properties, e.g. MFR, of the polymerised Polymer, for example, LDPE polymer, the properties can be adjusted by using e.g. chain transfer agent during the polymerisation, or by adjusting reaction temperature or pressure (which also to a certain extent have an influence on the unsaturation level).

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, for example, ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an α,ω-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide said double bonds.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Inorganic Filler (b)

The inorganic filler (b) can be any inorganic filler, for example, any conventional, such as a commercially available inorganic filler, suitable for an insulation layer.

Further, the inorganic filler (b) is, for example, selected from inorganic oxides, hydroxides, carbonates, nitrides, carbides, kaolin clay, talc, borates, alumina, titania or titanates, silica, silicates, zirconia, glass fibers, glass particles, or any mixtures thereof.

Exemplified compounds of oxides, hydroxides, carbonates, nitrides, carbides, borates, titanates, silicates and silica as the inorganic filler (b): Non-limiting examples of oxides are $SiO_2$, MgO, $TiO_2$, ZnO, barium oxide, calcium oxide, strontium or oxide, or any mixtures thereof, for example, from $SiO_2$, MgO, $TiO_2$, ZnO, or any mixtures thereof. Non-limiting examples of hydroxides are magnesium hydroxide or calcium hydroxide, or mixtures thereof, for example, magnesium hydroxide, or any mixtures thereof. Non-limiting examples of carbonates are calcium carbonate or magnesium calcium carbonate, or any mixtures thereof. Non-limiting examples of nitrides is aluminium nitride. Non-limiting examples of carbides is silicon carbide. Non-limiting examples of borates are sodium borate or calcium borate, or any mixtures thereof. Non-limiting examples of titanates are barium strontium titanate, barium titanate or strontium titanate, or any mixtures thereof. Non-limiting examples of silicates are magnesium aluminium silicate, magnesium calcium silicate or zirconium silicate, or any mixtures thereof. Non-limiting examples of silica are quartz or amorphous silica, such as fumed silica or precipitated silica, or any mixtures thereof.

The inorganic filler (b) is, for example, selected from inorganic oxides, nitrides, carbides, kaolin clay, talc, borates, alumina, titania or titanates, silica, silicates, zirconia, glass fibers, glass particles, or any mixtures thereof. An exemplified inorganic filler (b) is an inorganic oxide, for example, an inorganic oxide selected from $SiO_2$, MgO, $TiO_2$ or ZnO, or any mixtures thereof, for example, from $SiO_2$, $TiO_2$ or MgO, or any mixtures thereof.

The inorganic filler (b) can be modified, e.g. functionalised by incorporating a functional moiety e.g. for modifying the surface properties of the filler, such as for modifying electrical properties or improving dispersion properties of the filler. Such modifications are well known to a skilled person and discussed e.g. in WO2006081400 referred to herein under background art.

Moreover, the inorganic filler (b) suitable for the present invention can be in the form of the inorganic filler (b) as such or in a form of a mixture comprising the inorganic filler (b) and a carrier medium, as well known in the art. The inorganic filler (b) as such is typically in a solid powder form.

According to one embodiment the polymer composition of the invention comprises
a polyolefin (a) and
a master batch (MB) which comprises an inorganic filler (b) and a carrier medium.

It is to be understood, that in case of a master batch (MB) embodiment, the amount of the inorganic filler (b) as described herein, does not mean the amount of MB, but the amount of inorganic filler (b) as such, present in the polymer composition, i.e. based on the combined amount of the pure inorganic filler (b) as such and the polyolefin (a).

If the inorganic filler (b) is incorporated into a carrier medium, then the carrier medium can be e.g. a liquid or solid powder product, for example, solid product. In case of a liquid carrier, the filler is typically suspended to a liquid. In case of a solid carrier, the mixture is a solid product, which can comprise solid inorganic filler (b) particles and solid carrier particles. Alternatively, the filler can be mixed with a carrier polymer and the obtained mixture is pelletised to MB pellets. The MB's are well known in the field of inorganic fillers.

End Uses and End Applications of the Polymer Composition of Invention

The polymer composition of the invention can be used for producing a layer of a direct current (DC) power cable, as described herein.

The invention further provides a direct current (DC) power cable comprising a conductor which is surrounded at least by an inner semiconductive layer, an insulation layer and an outer semiconductive layer, in that order, wherein at least the insulation layer comprises, for example, consists of, a polymer composition as described herein comprising
a polyolefin (a) and
an inorganic filler (b).

Accordingly, the inner semiconductive layer of the power cable comprises, for example, consists of, a first semiconductive composition, the insulation layer comprises, for example, consists of, an insulation composition, and the outer semiconductive layer comprises, for example, consists of, a second semiconductive composition. Thus at least the insulation composition comprises, for example, consists of the polymer composition of the invention as described herein including the exemplified subgroups thereof.

The term "conductor" means herein that the conductor comprises one or more wires. Moreover, the cable may comprise one or more such conductors, for example, the conductor is an electrical conductor and comprises one or more metal wires.

The first and the second semiconductive compositions can be different or identical and comprise a polymer(s) which is, for example, a polyolefin or a mixture of polyolefins and a conductive filler, for example, carbon black. Suitable polyolefin(s) are e.g. polyethylene produced in a low pressure process or a polyethylene produced in a HP process (LDPE). The general polymer description as described herein in relation to the polyolefin (a) applies also for the suitable polymers for semiconductive layers. The carbon black can be any conventional carbon black used in the semiconductive layers of a power cable, for example, in the semiconductive layer of a DC power cable, for example, the carbon black has one or, for example, all, of the following properties: a) a primary particle size of at least 5 nm which is defined as the number average particle diameter according ASTM D3849-95a, dispersion procedure D,
b) iodine number of at least 30 mg/g according to ASTM D1510, and/or c) oil absorption number of at least 30 ml/100 g which is measured according to ASTM D2414. Non-limiting examples of carbon blacks are e.g. acetylene carbon black, furnace carbon black and Ketjen carbon black, for example, furnace carbon black and acetylene carbon black, for example, the polymer composition comprises 10 to 50 wt % carbon black, based on the weight of the Semiconductive composition.

The DC power cable of the invention is, for example, crosslinkable, wherein at least the insulation layer comprises, for example, consists of, the polymer composition, as described herein, comprising
a polyolefin (a) and
an inorganic filler (b), as described herein, and
a crosslinking agent, for example, a peroxide in an amount of up to 110 mmol —O—O—/kg polymer composition, for example, of up to 90 mmol —O—O—/kg polymer composition, for example, of 1.0 to 75 mmol —O—O—/kg polymer composition, for example, of less than 50 mmol —O—O—/kg polymer composition, for example, of less than 40 mmol —O—O—/kg polymer composition, for example, of less than 37 mmol —O—O—/kg polymer composition, for example, of less than 35 mmol —O—O—/ kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, for example, from 10.0 to 30 mmol —O—O—/kg polymer composition.

Naturally, the further exemplified subgroups of the properties described herein, further properties, variants and embodiments as described herein for the polymer composition or for the polyolefin (a) and the inorganic filler (b) components thereof apply similarly to the DC power cable, of the invention.

As well known the cable can optionally comprise further layers, e.g. layers surrounding the insulation layer or, if present, the outer semiconductive layers, such as screen(s), a jacketing layer(s), other protective layer(s) or any combinations thereof.

The invention also provides a process for producing a power cable, for example, a DC power cable, as described herein, which is, for example, crosslinkable, whereby the process comprises the steps of applying on a conductor, for example, by (co)extrusion, an inner semiconductive layer comprising a first semiconductive composition, an insulation layer comprising an insulation composition and an outer semiconductive layer comprising a second semiconductive composition, in that order, wherein at least the insulation composition of the insulation layer comprises, for example, consists of, the polymer composition comprising a polyolefin (a) and an inorganic filler (b), as described herein, and optionally, and, for example, a crosslinking agent, which is, for example, a peroxide in an amount of up to 110 mmol —O—O—/kg polymer composition, for example, of up to 90 mmol —O—O—/kg polymer composition, for example, of 0 to 75 mmol —O—O—/kg polymer composition, for example, of less than 50 mmol —O—O—/kg polymer composition, for example, of less than 40 mmol —O—O—/kg polymer composition, for example, of less than 37 mmol —O—O—/kg polymer composition, for example, of less than 35 mmol —O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, for example, from 10.0 to 30 mmol —O—O—/kg polymer composition, for example, the polymer composition comprises the crosslinking agent and the process comprises a further step of crosslinking at least the polymer composition of said insulation layer, in the presence of the crosslinking agent, for example, in an amount as described herein, at crosslinking conditions, and optionally, and, for example, crosslinking at least one, for example, both, of the first semiconductive composition of the inner semiconductive layer and the second semiconductive composition of the outer semiconductive layer, in the presence of a crosslinking agent at crosslinking conditions.

Moreover, a crosslinkable DC power cable, for example, a crosslinkable HV DC power cable, is produced, wherein the process comprises the steps of (a)

providing and mixing, for example, melt mixing in an extruder, an optionally, and, for example, crosslinkable first semiconductive composition comprising a polymer, a carbon black and optionally further component(s) for the inner semiconductive layer, providing and mixing, for example, melt mixing in an extruder, a crosslinkable polymer composition of the invention for the insulation layer, providing and mixing, for example, melt mixing in an extruder, an optionally, and, for example, crosslinkable second semiconductive composition comprising a polymer, a carbon black and optionally further component(s) for the outer semiconductive layer, (b) applying on a conductor, for example, by coextrusion, a melt mix of the first semiconductive composition obtained from step (a) to form the inner semiconductive layer, a melt mix of polymer composition of the invention obtained from step (a) to form the insulation layer, and a melt mix of the second semiconductive composition obtained from step (a) to form the outer semiconductive layer, and (c) optionally crosslinking in the presence of a crosslinking agent and at crosslinking conditions one or more of the polymer composition of the insulation layer, the first semiconductive composition of the inner semiconductive layer and the second semiconductive composition of the outer semiconductive layer, of the obtained cable, for example, at least the polymer composition of the insulation layer, for example, the polymer composition of the insulation layer, the first semiconductive composition of the inner semiconductive layer and optionally, and, for example, the second semiconductive composition of the outer semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and exemplified first and second semiconductive compositions can be produced before or during the cable production process. Moreover the polymer composition of the invention and the optional and exemplified first and second semiconductive composition can each independently comprise part or all of the component(s) of the final composition, before introducing to the (melt)mixing step a) of the cable production process.

The (melt)mixing step (a) of the provided polymer composition of the invention and of the exemplified first and second semiconductive compositions is, for example, carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s). In case one of the polyolefin (a) or the inorganic filler (b), or the optional and exemplified peroxide(s) and part or all of the optional further component(s), such as further additive(s), of the polymer composition of the invention and, respectively, part or all of the component(s) of the first or second semiconductive compositions, are added to the polyolefin during the cable production process, then the addition(s) can take place at any stage during the mixing step (a), e.g. at the optional separate mixer preceding the cable extruder or at any point(s) of the cable extruder.

If the inorganic filler (b) is added during the (melt)mixing step (a), then it can added to the polyolefin (a) as such or in form of a master batch (MB) as described herein, as well known in the art.

The dispersion of the inorganic filler (b) to the other components, such as the polyolefin (a), of the polymer composition can be adjusted as desired e.g. by modifying the surface properties of the inorganic filler, by using a MB of the inorganic filler (b) or by optimising the shear rate during the mixing step of the polymer composition. The conditions of the mixing step (a) can be adapted by a skilled person depending on the used inorganic filler (b), which are typically commercial products, to achieve a homogeneous dispersion of the components.

Accordingly, for example, at least the polymer component(s) of the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to a solid particulate polymer product. A well-known post-reactor modification is pelletising a melt mix of a polymer product and optional additive(s) in a pelletising equipment to solid pellets. Pellets can be of any size and shape.

Moreover, the polyolefin (a) and the inorganic filler (b) may be mixed together before introducing to the cable production process. Thus the polymer composition may be a premade mixture in a form of a solid powder, grain or pellet product, for example, a pellet product. This premade mixture, for example, the pellets where each pellet comprises both the polyolefin (a) and the inorganic filler (b) is then provided to the (melt)mixing step (a) of cable production process. Alternatively, each of the polyolefin (a) and the inorganic filler (b) can be provided separately to the (melt) mixing step (a) of the cable production process, where the components are blended together during the step (a).

It is exemplified that the polyolefin (a) and the inorganic filler (b) are both in a same powder, grain or pellet product, for example, in a pellet product as described herein, which premade mixture is used in the cable production process.

All or part of the optional additives can be present in any such powder, grain or pellets or added separately.

As mentioned herein, the polymer composition, for example, comprises a crosslinking agent, which is, for example, peroxide. The crosslinking agent can be added before the cable production process or during the (melt) mixing step (a). For instance, and, for example, the crosslinking agent and also the optional further component(s), such as additive(s), can already be present in the polyolefin (a) or the inorganic filler (b), or if a master batch of the inorganic filler (b) is used, in said MB, before the use in the production line of the cable production process. The crosslinking agent can be e.g. melt mixed together with the polyolefin (a) or the inorganic filler (b), or both, or a mixture thereof, and optional further component(s), and then the melt mix is pelletised. Alternatively and, for example, the crosslinking agent is added, for example, impregnated, to solid polymer particles, for example, to pellets of the polyolefin (a) component, for example, to pellets of the polymer composition. If crosslinking agent is used to crosslink the polymer composition, then it is, for example, added to the pellets of the polymer composition comprising the polyolefin (a) and the inorganic filler (b) prior to introduction to the (melt)mixing step (a) of the cable production process. Then the premade pellets can later be used for cable production.

It is exemplified that the melt mix of the polymer composition obtained from melt mixing step (a) consists of the polyolefin (a) of the invention as the sole polymer component. However it is to be understood that the inorganic filler (b) and/or the optional, and exemplified, additive(s) can be added to polymer composition as such or as a mixture with a carrier polymer, i.e. in a form of so-called master batch.

In an exemplified embodiment of the cable production process, a crosslinkable DC power cable, for example, a crosslinkable HV DC power cable, is produced, wherein the insulation layer comprises, for example, consists of, a crosslinkable polymer composition of the invention which further comprises a peroxide in an amount as described herein, and wherein at least the crosslinkable insulation layer of the obtained cable is crosslinked in step c) at crosslinking conditions.

Moreover, in this crosslinkable embodiment, a crosslinked DC power cable, for example, a crosslinked HV DC power cable, is provided.

Crosslinking of the polymer composition of the insulation layer is, for example, carried out in the presence of a peroxide in an amount as described herein, and the optional and exemplified crosslinking of the first semiconductive composition of the inner semiconductive, is carried out in the presence of crosslinking agent(s), for example, in the presence of free radical generating agent(s), which is, for example, a peroxide(s).

The crosslinking agent(s) can already be present in the optional first and second semiconductive composition before introducing to the crosslinking step c) or introduced during the crosslinking step. Peroxide is the exemplified crosslinking agent for said optional first and second semiconductive compositions and is, for example, included to the pellets of semiconductive composition before the composition is used in the cable production process as described herein.

Crosslinking can be carried out at increased temperature which is chosen, as well known, depending on the type of crosslinking agent. For instance temperatures above 150° C., such as from 160 to 350° C., are typical, however without limiting thereto.

A further embodiment of the present invention discloses a crosslinked polymer composition, wherein a polymer composition is exposed to a curing procedure during which the maximum temperature of said polymer composition is, for example, above 150° C., e.g. 160 to 350° C., e.g. less than 280° C., e.g. 250° C. or less, or, for example, 180° C. or less.

An even further embodiment of the present invention discloses a crosslinked polymer composition, wherein a polymer composition is exposed to a curing procedure during which the maximum temperature of said polymer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a crosslinked polymer composition, wherein a polymer composition is exposed to a curing procedure during which the maximum temperature of said polymer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a crosslinked polymer composition, wherein a polymer composition is exposed to a curing procedure during which the maximum temperature of said polymer composition is 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a crosslinked polymer composition, wherein a polymer composition is exposed to a curing procedure during which the maximum temperature of said polymer composition is 180° C. or less.

Still a further embodiment of the present invention discloses a crosslinked polymer composition, wherein a polymer composition is exposed to a curing procedure during which the maximum temperature of said polymer composition is at least 150° C. or, alternatively, at least 160° C.

The processing temperatures and devices are well known in the art, e.g. conventional mixers and extruders, such as single or twin screw extruders, are suitable for the process of the invention.

The invention further provides a crosslinked direct current (DC) power cable, for example, a crosslinked HV DC power cable, where the inner semiconductive layer comprises, for example, consists of, an optionally crosslinked first semiconductive composition, the polymer composition of the insulation layer comprises, for example, consists of, a crosslinked polymer composition of the invention as described herein, and the outer semiconductive layer comprises, for example, consists of, an optionally crosslinked second semiconductive composition, for example, where the inner semiconductive layer comprises, for example, consists of, a crosslinked first semiconductive composition, the polymer composition of the insulation layer comprises, for example, consists of, a crosslinked polymer composition of the invention as described herein crosslinked, and the outer semiconductive layer comprises, for example, consists of, a crosslinked second semiconductive composition.

The non-crosslinked, or, and, for example, crosslinked power cable comprising the non-crosslinked, or, for example, crosslinked, polymer composition of the invention in an insulation layer, has, i.a.

The advantageous electrical properties,

If the polymer composition of the invention is crosslinked, then the exemplified low peroxide content prior crosslinking enables robust high speed extrusion possible leading to longer stable production periods at higher extrusion speed and quality due to lowered (or no) risk to scorching (undesired premature crosslinking) of the polymer composition in the extruder and/or in the layer(s), If the polymer composition of the invention is crosslinked, then the exemplified low peroxide content results in lesser amounts of any undesired by-products, i.e. decomposition products, formed from the crosslinking agent. Thus, any degassing step can be reduced, which would accelerate the overall cable production process, Unexpectedly, the power cable, when non-crosslinked or crosslinked with the exemplified lower peroxide content is mechanically sufficient.

The exemplified DC power cable of the invention is a HV DC power cable, for example, the HV DC power cable operates at voltages, as described herein, for HV DC cable or extra HV DC cable, depending on the desired end cable application.

Moreover, the power cable, for example, the DC power cable, for example, the HV DC power cable, of the invention is crosslinked as described herein.

The thickness of the insulation layer of the DC power cable, for example, of the HV DC power cable, is typically 2 mm or, for example, at least 3 mm, for example, of at least 5 to 100 mm, for example, from 5 to 50 mm, and conventionally 5 to 40 mm, e.g. 5 to 35 mm, when measured from a cross section of the insulation layer of the cable. The thickness of the inner and outer semiconductive layers is typically less than that of the insulation layer, and in HV DC power cables can be e.g. more than 0.1 mm, such as from 0.3 up to 20 mm, for example, from 0.3 to 10 mm. The thickness of the inner semiconductive layer is, for example, 0.3-5.0 mm, for example, 0.5-3.0 mm, for example, 0.8-2.0 mm. The thickness of the outer semiconductive layer is, for example, from 0.3 to 10 mm, such as 0.3 to 5 mm, for example, 0.5 to 3.0 mm, for example, 0.8-3.0 mm. It is evident for and within the skills of a skilled person that the thickness of the layers of the DC cable depends on the intended voltage level of the end application cable and can be chosen accordingly.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature. The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (as in heterophasic PP copolymer) (720 cm$^{-1}$). The absorbance at 4324 cm$^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in a Low Density Polyethylene (LDPE)

(1) Polymers Containing >6 wt. % Polar Comonomer Units

Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}$–A2475). Then the maximum absorbance peak for the polyethylene peak at 2660 cm$^{-1}$ was subtracted with the absorbance value for the base line at 2475 cm$^{-1}$ ($A_{2660}$–$A_{2475}$). The ratio between ($A_{methylacrylate}$–$A_{2475}$) and ($A_{2660}$–$A_{2475}$) was then calculated in the conventional manner which is well documented in the literature.

The weight-% can be converted to mol-% by calculation. It is well documented in the literature.

Quantification of copolymer content in polymers by NMR spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described herein under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}$–$A_{1850}$). Then the maximum absorbance peak for polyethylene peak at 2660 cm$^{-1}$ was subtracted with the absorbance value for the base line at 1850 cm$^{-1}$ ($A_{2660}$–$A_{1850}$). The ratio between ($A_{comonomer}$–$A_{1850}$) and ($A_{2660}$–$A_{1850}$) was then calculated. The NMR spectroscopy calibration procedure was undertaken in the conventional manner which is well documented in the literature, as described herein under method 1).

The weight-% can be converted to mol-% by calculation. It is well documented in the literature.

Below is exemplified how polar comonomer content obtained from the method (1) or (2) as described herein, depending on the amount thereof, can be converted to micromol or mmol per g polar comonomer:

The millimoles (mmol) and the micro mole calculations have been done as described herein.

For example, if 1 g of the poly(ethylene-co-butylacrylate) polymer, which contains 20 wt % butylacrylate, then this material contains 0.20/$M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g. The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Low polymerisation process polyethylene: Density of the polymer was measured according to ISO 1183/1872-2B.

Method for Determination of the Amount of Double Bonds in the Polymer Composition or in the Polymer Quantification of the Amount of Carbon-Carbon Double Bonds by IR Spectroscopy Quantitative infrared (IR) spectroscopy was used to quantify the amount of carbon-carbon double bonds (C=C). Specifically solid-state transmission FTIR spectroscopy was used (Perkin Elmer 2000). Calibration was achieved by prior determination of the molar extinction coefficient of the C=C functional groups in representative low molecular weight model compounds of know structure.

The amount of a given C=C functional group containing species (N) was defined as number of carbon-carbon double bonds per thousand total carbon atoms (C=C/1000C) according to:

$$N = (A \times 14)/(E \times L \times D)$$

where A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

For systems containing unsaturation three types of C=C containing functional groups were considered, each with a characteristic C=C—H out-of-plain bending vibrational mode, and each calibrated to a different model compound resulting in individual extinction coefficients:
- vinyl (R—CH—CH2) via at around 910 cm−1 based on 1-decene [dec-1-ene] giving E=13.13 l·mol−1·mm−1
- vinylidene (RR'C=CH2) at around 888 cm−1 based on 2-methyl-1-heptene [2-methylhept-1-ene] giving E=18.24 l·mol−1·mm−1
- trans-vinylene (R—CH=CH—R') at around 965 cm−1 based on trans-4-decene [(E)-dec-4-ene] giving E=15.14 l·mol−1−mm−1

The specific wavenumber of this absorption was dependent on the specific chemical structure of the species. When non-aliphatic unsaturated group were addressed the molar extinction coefficient was taken to be the same as that of their related aliphatic unsaturated group, as determined using the aliphatic small molecule analogue.

The molar extinction coefficient was determined according to the procedure given in ASTM D3124-98 and ASTM D6248-98. Solution-state infrared spectra were recorded on standard solutions using a FTIR spectrometer (Perkin Elmer 2000) equipped with a 0.1 mm path length liquid cell at a resolution of 4 cm$^{-1}$. The molar extinction coefficient (E) was determined as $l \cdot mol^{-1} \cdot mm^{-1}$ via:

$$E = A/(C \times L)$$

where A is the maximum absorbance defined as peak height, C the concentration ($mol \cdot l^{-1}$) and L the cell thickness (mm). At least three 0.18 $mol \cdot l^{-1}$ solutions in carbondisulphide ($CS_2$) were used and the mean value of the molar extinction coefficient determined.

DC Conductivity Method

Electrical conductivity measured at 70° C. and 30 kV/mm mean electric field from a 1 mm plaque sample consisting of the polymer composition which is a non-crosslinked sample (method).

The plaques are compression moulded from pellets of the test polymer composition. The final plaques consist of the test polymer composition and have a thickness of 1 mm and a diameter of 330 mm.

The conductivity measurement can be performed using a test polymer composition which does not comprise or comprises the optional crosslinking agent. In case of no crosslinking agent is used, then the sample is prepared according to method 1 as described herein and the conductivity is measured from a non-crosslinked plaque sample using the below procedure. If the test polymer composition comprises the crosslinking agent, then the crosslinking occurs during the preparation of the plaque samples. In case of a crosslinked sample, the sample is prepared according to method (non-degassed sample) as described herein. The conductivity is measured according to the below procedure from the resulting crosslinked plaque sample. Crosslinking agent, if present in the polymer composition prior to crosslinking, is, for example, a peroxide, as herein.

The plaques are press-moulded at 130° C. for 12 min while the pressure is gradually increased from 2 to 20 MPa. Thereafter the temperature is increased and reaches 180° C., or alternatively 250° C., after 5 min. The temperature is then kept constant at 180° C., or alternatively 250° C., for 15 min during which the plaque becomes fully crosslinked by means of the peroxide, if present in the test polymer composition. Finally the temperature is decreased using the cooling rate 15° C./min until room temperature is reached when the pressure is released.

Method: Preparation of a non-crosslinked sample or of a crosslinked sample which is not degassed (crosslinked non-degassed sample). The plaques are immediately after the pressure release wrapped in metallic foil in order to prevent loss of volatile substances.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

Experimental Part

Experimental:

Preparation of the Components of the Polymer Compositions of the Present Invention and of the References The polyolefin were low density polyethylenes produced in a high pressure reactor. The production of inventive and reference polymers is described herein.

LDPE:

Purified ethylene was liquefied by compression and cooling to a pressure of 90 bars and a temperature of −30° C. and split up into two equal streams of roughly 14 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of around 2100-2300 bars and exit temperatures of around 40° C. These two streams were respectively fed to the front (zone 1) (50%) and side (zone 2) (50%) of a split-feed two-zone tubular reactor. MEK was added in amounts of 226 kg/h to the front stream to maintain a MFR$_2$ of around 2 g/10 min. The front feed stream was passed through a heating section to reach a temperature sufficient for the exothermal polymerization reaction to start. The reaction reached peak temperatures were 251° C. and 330° C. in the first and second zones, respectively. The side feed stream cooled the reaction to an initiation temperature of the second zone of 165-170° C. Air and peroxide solution was added to the two streams in enough amounts to reach the target peak temperatures. The reaction mixture was depressurized by product valve, cooled and polymer was separated from unreacted gas.

TABLE 1

Polymer properties of LDPE

| Base Resin Properties | LDPE |
|---|---|
| MFR 2.16 kg, at 190° C. [g/10 min] | 1.90 |
| Density [kg/m$^3$] | 922 |
| Vinyl [C═C/1000 C.] | 0.33 |
| Vinylidene [C═C/1000 C.] | 0.27 |
| Trans-vinylene [C═C/1000 C.] | 0.07 |

Inorganic Fillers:
SiO$_2$:

Commercially available SiO$_2$, namely Aerosil® R7200 (supplier Evonik), which is a structure modified and with methacrylsilane aftertreated, fumed silica based on Aerosil® 200, CAS NR: 100 402-78-6.

TABLE 2

| Properties | Unit | Typical Value |
|---|---|---|
| Specific surface area (BET) | m$^2$/g | 150 ± 25 |
| Carbon content | wt % | 4.5-6.5 |
| Tamped density* acc. to DIN EN ISO 787/11, August 1983 | g/l | approx. 230 |
| Moisture* 2 hours at 105° C. | wt % | ≤1.5 |
| Ignition loss 2 hours at 1000° C. based on material dried for 2 hours at 105° C. | wt % | 6.0-11.0 |
| pH in 4% Dispersion | | 4.0-6.0 |
| SiO$_2$ - content based on ignited material | wt % | ≥99.8 |

*ex plant

The data represents typical values (no product specification).

Determination of the Specific Surface Area (DIN ISO 9277)
Determination of the Carbon Content (DIN ISO 3262-20 Paragraph 8)
Determination of the Ignition Loss (DIN 3262-20)
Determination of the Silicon Dioxide Content (DIN ISO 3262-20 Paragraph 6)
Determination of the Tapped Density (ISO ISO 787/11)

MgO:

Commercially available MgO, article number 44733, supplier Alfa Aesar, was not surface treated, CAS nr: 1309-48-4. 100 nm APS Powder, S.A.>7.3 m$^2$/g (given by the supplier).

Compounding of the Polymer Compositions:

The inorganic filler component of the inventive compositions was first dried over night at 100° C. and then used for the compounding step. Each pellets of the polymer component of a test polymer composition together with additives, if not present in the pellets, other than the crosslinking agent, and the inorganic filler component, if present, were added as separately to a pilot scale extruder (Buss kneader PR46B-11D/H1) The obtained mixture was melt mixed in conventional conditions and extruded to pellets in a conventional manner using the settings disclosed.

Buss Kneader PR46B-11D/H1

| Set Values Temperature [° C.] | | | | | | Mixer | | Extruder | |
|---|---|---|---|---|---|---|---|---|---|
| Mixer Screw | Zon 1 | Zon 2 | Extr.* Screw | Extr.* barrel | Heat Die | Speed [rpm] | Output [kg/h[ ] | Speed [rpm] | Pressure ] [bar] |
| 60 | 195 | 180 | 160 | 170 | 170 | 214.0 | 10.00 | 15.2 | 12.0 |

Extr.* = Extruder

The crosslinking agent, herein peroxide, if present, was added to the pellets and the resulting pellets were used for the experimental part.

The amounts of polymer component(s), peroxide, additives (AO) are given in table 3:

TABLE 3

Polymer compositions of the inventions and reference compositions and the electrical conductivity results:

| | Inv. comp 1 | Inv. comp 2 | Ref |
|---|---|---|---|
| Components | | | |
| LDPE [wt %*] | 98.5 | 98 | 100 |
| Compressor lubricant used in the LDPE polymerisation | PAG, of which 20-200 ppm has gone into | PAG, of which 20-200 ppm has gone into | PAG, of which 20-200 ppm has gone into |

TABLE 3-continued

Polymer compositions of the inventions and reference compositions and the electrical conductivity results:

|  | Inv. comp 1 | Inv. comp 2 | Ref |
|---|---|---|---|
| process | LDPE, i.e. polyolefin (a) | LDPE, i.e. polyolefin (a) | LDPE, i.e. polyolefin (a) |
| Inorganic filler, Aerosil R7200 [wt %*] | 1.5 | | |
| Inorganic filler, MgO [wt %*] | | 2 | |
| Antioxidant (AO) [wt %**] | 0.08 | 0.08 | 0.08 |
| Crosslinking agent, mmol - O—O-/kg polymer composition [wt %**] | 21 (0.55) | 21 (0.55) | 21 (0.55) |
| DC Conductivity: | | | |
| Method, non-degassed, 1 mm plaque (fS/m), crosslinking at 180° C. | 101 | 103 | 128 |
| Method, non-degassed, 1 mm plaque (fS/m), crosslinking at 250° C. | 138 | 113 | 191 |

Crosslinking agent: Dicumylperoxide (CAS no. 80-43-3)
AO: Antioxidant: 4,4'-thiobis (2-tertbutyl-5-methylphenol) (CAS no. 96-69-5)
*The amounts of polymer component LDPE and the inorganic filler in table 3 are based on the combined amount of the polymer component LDPE and the inorganic filler. The amount 100 wt % of polymer component in table 3 means that the polymer is used alone without the inorganic filler.
**The amounts of peroxide (wt %) and AO are based on the final composition.

The table 3 shows that the DC conductivity of the non-degassed inventive compositions are advantageously low, see the Inventive composition 1 and 2 which both have clearly lower DC conductivity than the reference with the same LDPE. The test results show further that the polymer composition of the present invention comprising a non-mineral oil maintains an advantageously low DC conductivity when the polymer composition further comprises the inorganic filler.

In general, the table 3 shows that the polymer composition of the invention is highly advantageous for power cable, e.g. for DC cable, for example, for HV DC cable applications.

The invention claimed is:

1. A polymer composition comprising a polyolefin (a), a peroxide and an inorganic filler (b) wherein the polyolefin (a) is obtainable by a high-pressure process which process comprises the steps:
   (i) compressing one or more monomer(s) under pressure in a compressor, using a compressor lubricant for lubrication,
   (ii) polymerising a monomer optionally together with one or more comonomer(s) in a polymerisation zone,
   (iii) separating the obtained polyolefin (a) from the unreacted products and recovering the separated polyolefin (a) in a recovery zone, wherein in step (i) the compressor lubricant comprises a non-mineral oil; and
   wherein the polyolefin (a) is an unsaturated LDPE polymer, which is selected from an unsaturated LDPE homopolymer or an unsaturated LDPE copolymer of ethylene with one or more comonomer(s), and comprises C=C bonds in total amount of 0.2/1000 carbon atoms;
   wherein the amount of the inorganic filler (b) is 0.1 to 5.0 wt % based on the combined amount of the polyolefin (a) and the inorganic filler (b);
   wherein the polyolefin (a) comprises 10 to 250 ppm of the non-mineral oil; and wherein the polymer composition comprises peroxide in an amount of 5.0 to less than 40 mmol —O—O—/kg of the polymer composition.

2. A polymer composition according to claim 1, wherein the non-mineral oil is polyalkylene glycol (PAG).

3. A polymer composition according to claim 1, wherein the polymer composition has an electrical conductivity of 140 fS/m or less, for example, of 135 fS/m or less, for example, of 130 fS/m or less, for example, of 125 fS/m or less, for example, of 120 fS/m or less, for example, of 115 fS/m or less, for example, of from 0.01 to 110 fS/m or less, for example, of from 0.05 to 105 fS/m or less, when measured according to DC conductivity method using a 1 mm thick plaque sample as described under "Determination Methods.

4. A polymer composition according to claim 1 wherein the amount of polyolefin (a) in the polymer composition of the invention is at least 35 wt %, for example, at least 40 wt %, e.g. at least 50 wt %, for example, at least 75 wt %, e.g. 80 to 100 wt % or, for example, 85 to 100 wt %, of the total weight of the polymer component(s) present in the polymer composition, e.g. the amount of the polyolefin (a) is 70 wt % or, for example, 80 wt % or, e.g. 85 to 99.95 wt %, for example, 90.0 to 99.9 wt %, e.g. 95.0 to 99.9 wt %, for example, 96.0 to 99.9 wt %, based on the combined amount of the polyolefin (a) and the inorganic filler (b).

5. A polymer composition according to claim 1, wherein the amount of the inorganic filler (b) is 0.1 to 4.0 wt %, based on the combined amount of the polyolefin (a) and the inorganic filler (b).

6. A polymer composition according to claim 1, wherein the polyolefin (a) is a polyethylene, for example a polyethylene selected from a polyethylene polymerised in the presence of an olefin polymerisation catalyst and selected from an ethylene homopolymer or a copolymer of ethylene with one or more comonomer(s); or a polyethylene polymerised in a high pressure polymerisation process and, for example in the presence of an initiator(s), e.g. a low density polyethylene (LDPE) polymer polymerised in a high pressure polymerisation process and in the presence of an intiator(s), for example an LDPE selected from an optionally unsaturated LDPE homopolymer or an optionally unsaturated LDPE copolymer of ethylene with one or more comonomer(s), e.g. an LDPE selected from an optionally unsaturated LDPE homopolymer or an optionally unsaturated LDPE copolymer of ethylene with one or more comonomer(s).

7. A polymer composition according to claim 1 wherein the polyolefin(a) is an unsaturated LDPE copolymer of ethylene with at least one polyunsaturated comonomer and optionally with one or more other comonomer(s), the polyunsaturated comonomer consists, for example, of a straight carbon chain with at least 8 carbon atoms and at least 4 carbons between the non-conjugated double bonds, of which at least one is terminal, e.g., said polyunsaturated comonomer is a diene, for example a diene which comprises at least eight carbon atoms, the first carbon-carbon double bond being terminal and the second carbon-carbon double bond being non-conjugated to the first one, for example, a diene which is selected from C8- to C14-non-conjugated diene or mixtures thereof, e.g. selected from 1,7-octadiene, 1,9-decadiene, 1,11-dodecadiene, 1,13-tetradecadiene, 7-methyl-1,6-octadiene, 9-methyl-1,8-decadiene, or mixtures thereof, for example, from 1,7-octadiene, 1,9-decadiene, 1,11-dodecadiene, 1,13-tetradecadiene, or any mixture thereof.

8. A polymer composition according to claim 1, wherein the inorganic filler (b) is selected from inorganic oxides, hydroxides, carbonates, nitrides, carbides, kaolin clay, talc, borates, alumina, titania or titanates, silica, silicates, zirconia, glass fibers, glass particles, or any mixtures thereof.

9. A polymer composition according to claim 1 wherein the inorganic filler (b) is selected from inorganic oxides, nitrides, carbides, kaolin clay, talc, borates, alumina, titania or titanates, silica, silicates, zirconia, glass fibers, glass particles, or any mixtures thereof, the inorganic filler (b) is, for example an inorganic oxide, e.g. an inorganic oxide selected from $SiO_2$, MgO, $TiO_2$ or ZnO, or any mixtures thereof, for example from $SiO_2$, $TiO_2$ or MgO, or any mixtures thereof.

10. A polymer composition according to claim 1, wherein the polymer composition comprises crosslinking agent in an amount of 5.0 to less than 37 mmol —O—O—/kg polymer composition, e.g. less than 35 mmol —O—O—/kg polymer composition, for example of 0.1 to 34 mmol —O—O—/kg polymer composition, e.g. of 0.5 to 33 mmol —O—O—/kg polymer composition, for example from 5.0 to 30 mmol —O—O—/kg polymer composition, e.g. from 7.0 to 30 mmol —O—O—/kg polymer composition, for example from 10.0 to 30 mmol —O—O—/kg polymer composition.

11. A power cable, for example a direct current (DC) power cable, comprising a conductor which is surrounded at least by an inner semiconductive layer, an insulation layer and an outer semiconductive layer, in that order, wherein at least one layer, for example at least the insulation layer, comprises a polymer composition according to claim 1.

12. A process for producing a DC power cable, wherein the process comprises the steps of applying on a conductor, for example, by (co)extrusion, an inner semiconductive layer comprising a first semiconductive composition, an insulation layer comprising an insulation composition and an outer semiconductive layer comprising a second semiconductive composition, in that order, wherein the insulation composition of the insulation layer comprises a polymer composition according to claim 1.

13. A polymer composition according to claim 1, wherein the inorganic filler (b) is MgO.

\* \* \* \* \*